United States Patent

[11] 3,584,956

| [72] | Inventors | Robin H. Hines;<br>John I. Shipp; Richard G. Ray, all of<br>Tullahoma, Tenn. |
|---|---|---|
| [21] | Appl. No. | 770,038 |
| [22] | Filed | Oct. 23, 1968 |
| [45] | Patented | June 15, 1971 |
| [73] | Assignee | Laser Systems and Electronics, Inc.<br>Tullahoma, Tenn. |

[54] LASER ANEMOMETER FREQUENCY TO VOLTAGE CONVERTERS
18 Claims, 1 Drawing Fig.

[52] U.S. Cl. .................................................. 356/28, 343/8
[51] Int. Cl. .................................................. G01p 3/36
[50] Field of Search .................................................. 356/28; 343/8

[56] References Cited
UNITED STATES PATENTS

| 3,249,936 | 5/1966 | Forestier | 343/8 |
| 3,409,369 | 11/1968 | Bickel | 356/28 |
| 3,413,850 | 12/1968 | Merrifield | 356/28 X |
| 3,446,558 | 5/1969 | Seaton | 356/28 X |

*Primary Examiner*—Rodney D. Bennett, Jr.
*Assistant Examiner*—Malcolm F. Hubler
*Attorney*—Cushman, Darby & Cushman ABSTRACT: A frequency to voltage converter for use with a laser velocity measuring system whereby a laser beam is passed through a flowing media, and a portion of the Doppler shifted beam is optically combined with the nonshifted beam to produce a fixed homodyne signal which is then applied to a photodetector to produce a modulated electrical signal. This modulated electrical signal is then passed through a high pass filter and a wide band amplifier having automatic gain control to each of two isolation amplifiers, one of which applies its signal to a summing amplifier directly, while the other amplifier applies its signal through a variable delay line to the summing amplifier to ensure that a continuous output signal will be produced. The output of the summing amplifier is then applied to a mixer along with the output of a local oscillator so that another modulated signal having a frequency greater than the frequency of the combined optical signal is produced which is then passed through a high pass filter to a discriminator. The output of the discriminator is then filtered through a low-pass filter and applied to an offset and gain control circuit to produce an output voltage which varies directly with the velocity of the flowing media.

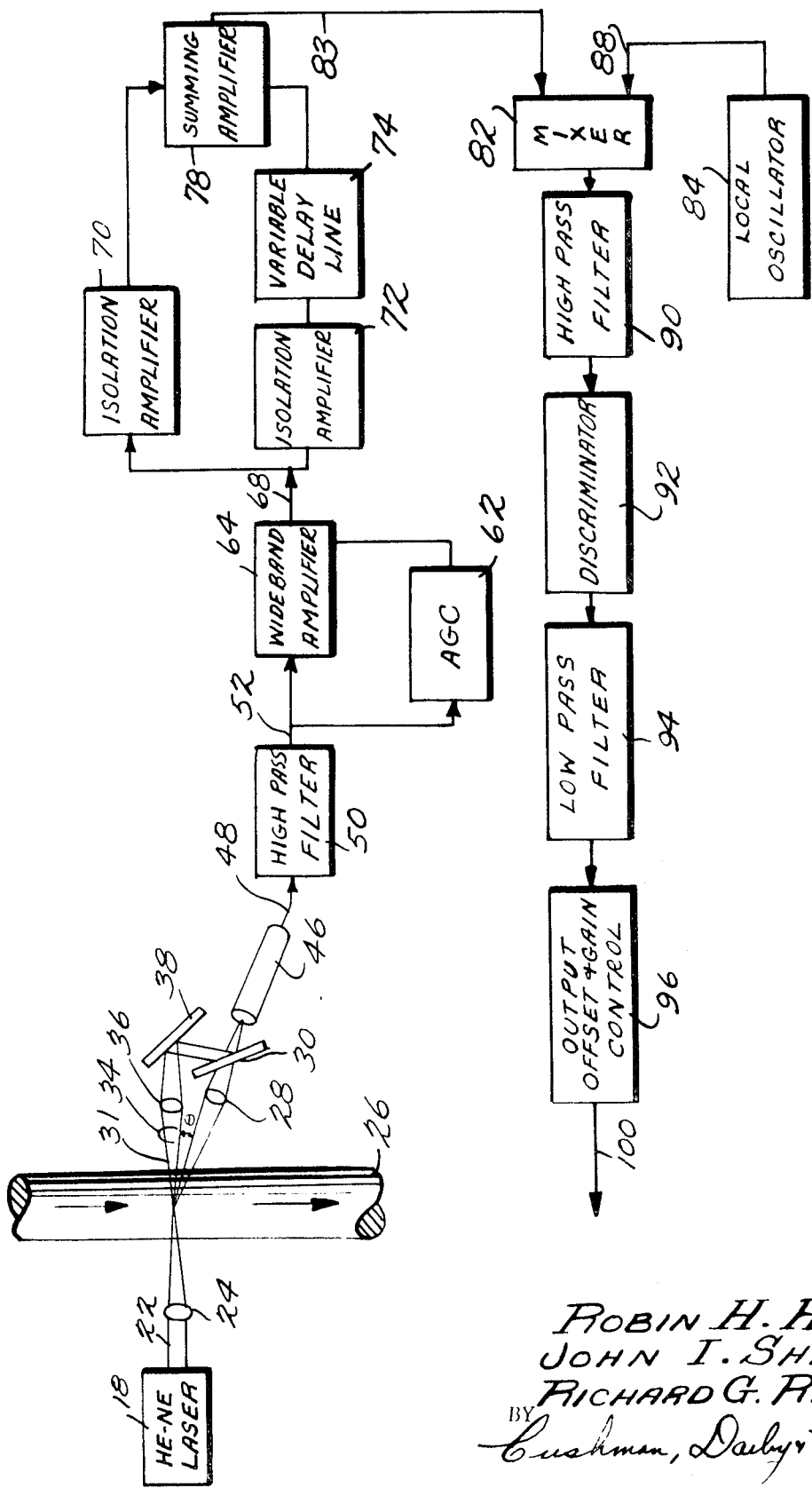

LASER ANEMOMETER FREQUENCY TO VOLTAGE CONVERTERS

A BRIEF DESCRIPTION OF THE PRIOR ART AND SUMMARY OF THE INVENTION

The innovation relates to a frequency to voltage converter, particularly for use with a laser beam velocity measuring or anemometer system.

It is often necessary to measure the velocity of a moving surface or media without disturbing the movement of that surface or media. Such a need is particularly evident with regard to flowing liquid media such as gas and other fluids since the act of measuring velocity with conventional velocity measuring apparatus alone often alters that velocity. Moreover, such conventional velocity measuring devices seldom provide suitable accuracy for many applications and tend to be complex and expensive.

In the prior art, inexpensive and accurate techniques for using laser beams to measure the velocity of a flowing media without affecting the media in any way have been developed and are based on the principle that as monochromatic light scatters from moving particles, the frequency of the light is shifted in a manner equivalent to the Doppler effect. A typical velocity measuring system based on this principle whereby a laser beam from a helium-neon gas laser is split and half passed through the moving gas media and while the other half is passed around the media to be combined with a portion of the scattered, and hence frequency shifted, beam to produce a homodyne signal having a modulation mathematically related to the velocity of the gas media is described in an article entitled, "Laser Beam Measures Velocity" which appeared in *Control Engineering* in July 1967.

After the shifted optical signal had been converted into a suitable electrical signal in the prior art, the Doppler shift was conventionally displayed as a sinusoidal wave on the oscilloscope, a side band on a spectrum analyzer, or converted to a DC signal by a phase-lock frequency meter. The drawbacks of using the oscilloscope and the spectrum analyzer are apparent in that they fail to produce an exact analog signal which is suitable for further processing or which provides an exact value without further interpretation. The phase-lock frequency meter on the other hand is conventionally limited in frequency to about 1 MHz., limited in deviation to about 15 percent and limited in deviation rate to about 500 cycles.

The present innovation relates to a frequency to voltage converter that is particularly useful in converting the Doppler frequency shifted signal produced by such a speed measuring system to an analog voltage output signal. Moreover, this novel converter is capable of dealing with a Doppler shift frequency range from about 2 kHz. to 75 MHz. and this upper frequency can be extended indefinitely by the use of appropriate local oscillators. The deviation of this novel converter can exceed 60 percent and the deviation rate can exceed 25 kHz. which is up to one-fourth the Doppler frequency in certain cases. While many frequency to voltage converters have been employed in the prior art for converting Doppler shifted signals to analog voltage, for example see the U.S. Pat. No. 3,118,139, to Durstewitz, none has been wholly satisfactory for a laser speed measuring system. However, the novel frequency to voltage converter described below has been found to be especially satisfactory for laser velocity measuring systems.

Conversion of the optical mixed signal to a direct current voltage signal is accomplished as follows in the novel converter described in detail below. First, the optical signals which is a combination of the shifted and unshifted beams, is applied to a photodetector which produces a modulated electrical signal varying in amplitude as the combined optical signal varied in intensity. This electrical signal is then amplified and applied to each of two isolation amplifiers. The output of one of the isolation amplifiers is applied directly to a summing amplifier while the output of the other is applied to the summing amplifier via a variable delay line. This adding of the signal to itself produces a continuous undistorted signal since scattering from highly turbulent media causes erratic signals and a dead time over about 80 percent or more of the adding time and since the period of the Doppler shifted signals changes slowly enough to allow combination of the signal with itself during that period.

The output of the summing amplifier is then applied to a mixer along with the output of a local oscillator. The mixer serves to narrow the frequency range from the wide range possible in the combined optical beam and thus serves to upconvert the Doppler frequency electrically to the operating range of the frequency discriminator. Next, the mixed signal is fed to the discriminator which then produces a direct current voltage signal whose amplitude varies directly with the velocity of the flowing media.

Other objects and purposes of the invention will become clear after reading the following detailed description of the drawings.

A BRIEF DESCRIPTION OF THE DRAWING

The Figure shows the elements of the novel frequency to voltage converter of this invention in block diagram and in combination with a conventional laser velocity measuring system.

A DETAILED DESCRIPTION OF THE DRAWING

Reference is now made to the Figure which shows an anemometer or laser velocity measuring system in use with the novel frequency to voltage converter of this invention which is shown in block form. As mentioned above, this laser velocity measuring system operates upon the principle that monochromatic light, when scattered from moving particles, undergoes a frequency shift proportional to the velocity of the scattering media. Thus, relatively large frequency shifts are obtainable when a laser, which is an excellent source of light having a very narrow frequency band is employed as the light source.

Of course, the actual magnitude of the Doppler frequency shift depends on the geometry of the scattering as well as the velocity of the moving particles. The following mathematical expression expresses the theoretical relationship between the Doppler shift frequency and the variables which determine that frequency:

$$f_D = (NV/\lambda_0)\sin\theta$$

where $f_D$ = Doppler Shift
$N$ = Index of Refraction of Flowing Media
$V$ = Velocity of Flowing Media
$\lambda_0$ = Wave Length of Incident Light
$\theta$ = Angle Between Scattered and Incident Beams Since all of these variables with the exception of the velocity of the flowing media can be known and controlled for any given media, the analog output signal can be calibrated directly in terms of velocity along for any given media.

The monochromatic light for the velocity measuring system shown in the Figure is preferably provided by a neon-helium laser 18 which is capable of producing 10 milliwatts of continuous energy. The light is emitted a fixed frequency of $4.74 \times 10^{14}$ Hz. and at a wavelength of 6328 Angstroms. While the neon-helium laser has been shown to be especially satisfactory for the arrangement shown in the Figure, any other type of laser or alternative source of monochromatic light can be employed.

The light beam 22 emitted by the laser 18 is first passed through a suitable concave lens 24 which serves to focus the beam 22 onto the flowing media 26 which may be fluid, gas, solid or a combination of these. In fact, any material which is capable of Doppler shifting the monochromatic light can be measured with this system. If the material is too opaque to properly pass the laser beam, then the Doppler reflected beam can be employed, and if the fluid media fails to produce scattered light at a suitable intensity, an optical scattering contaminant such as smoke can be added to the flowing media to increase the intensity of the scattered light to a usable level.

In the embodiment shown in the Figure, the portion of the helium-neon beam which passes through the flowing media 26 unscattered is employed as the unshifted reference beam 31. Alternatively, a beam splitter can be used to extract a portion of the laser beam 22 before passage through the media 26 and that portion employed as the reference beam 31.

Of course, the laser beam 22 passing through the flowing media 26 is dispersed through a wide variety of angles. However, only the portion of the laser beam scattered through one particular angle, which is chosen in advance, and which in this embodiment is angle $\theta$, is gathered by means of a lens 28 and focused on a beam splitter 30 along with the unscattered reference beam 31. The reference beam 31 which is that portion of the beam 22 which passed through the flowing media 26 essentially unscattered, is also focused by a density filter 34 and another concave lens 36 onto a mirror 38 which in turn reflects the reference beam 31 on to the beam splitter 30 which serves to combine the shifted and unshifted portions of the original laser beam 22. This combination of the shifted and unshifted light is then an optically mixed homodyne which is in effect modulated by the Doppler shifted frequency.

This combined optical signal is then applied to a photodetector 46 which serves to produce an electrical signal in place of the optical signal. The electrical signal thus produced, which is modulated in the same manner as the optical signal incident upon photodetector 46, is then passed to a high pass filter 50 on line 48. Since the frequency range of the signal on line 48 is practically limited to a range from 2 kHz. to 75 MHz., because of the initial frequency of the beam 22 and the practical variations in velocity of the flowing media 26, the high pass filter 50 is included to remove low frequency noise present from line sources and laser plasma oscillations.

The signal passed by the high pass filter 50 onto line 52 then represents a signal modulated at a deviation rate proportional to the rate of turbulent variation in the flow and at a deviation proportional to the turbulent intensity. This frequency related information is thus information relevant to the properties of the flow and is consequently the information to be obtained at the voltage output as a direct current voltage.

Present also in the electrical signal is an amplitude variation due to the scattering intensity variations inherent in the scattered optical beam. A slight variation (factor of five or less) is tolerable in the amplifier 64 but for greater amplitude variations, an automatic gain control circuit 62 is included in the wide band amplifier 64 which receives and amplifies the signal on line 52. This automatic gain control circuit 62 may be simply a RF diode detector, the output of which controls the emitter current of the wide band integrated circuit amplifier 64 so that the signal is amplified to a constant level of about 100 mv. peak to peak.

The output of the wide band amplifier 64 is then passed on line 68 both to an isolation amplifier 70 and to an isolation amplifier 72. Since the Doppler shifted laser beam is obtained from scattering particles in the fluid or gaseous flow, the intensity of the light varies with the scattering particles. Thus, for highly turbulent flow and flow near surfaces, the scattering is so erratic that the signal is present for typically only 10 to 20 percent of the time. The analog output of the frequency to voltage converter then goes to zero during these dead or dropout periods. Further, the flow information of interest is usually present at a frequency deviation rate of 10 KHz., which represents the maximum rate of turbulence for most flow systems, or less, corresponding to a maximum period of 100 microseconds. The Doppler frequency is typically 100 kHz. or higher corresponding to a period of 10 microseconds. For a dropout of 90 percent, only one period out of 10 will be present, the Doppler frequency is present for only 1 microsecond, and the information will not change for 100 microseconds. Similar figures can be easily computed and employed for those few systems where the deviation rate exceeds 10 kHz. The insertion of a delay line 74 to delay the output of isolation amplifier 72 and the summation of the output of amplifier 72 and the output of amplifier 78 via delay line 74 adds the signal to itself in a manner which does not distort the Doppler information but simply fills in the dead times and gives the converter a continuous analog output.

The output of summing amplifier 78 is then applied to the mixing circuit 82 on line 83 along with a sinusoidal signal from a local oscillator 84 on line 88. The mixer 82 may be a hot carrier diode double balanced mixer and the output obtained from such a mixer is, of course, a suppressed carrier upper and lower sideband signal. The local oscillator 84 may be driven at a frequency of 27 MHz. and 1 volt peak to peak. Of course, other mixers and oscillators may be alternatively employed.

The lower sideband is then removed by a high pass filter 90, which may be a single side band crystal filter, and passed to a discriminator 92, although it is ordinarily only necessary to remove the lower sideband for Doppler shifts of 500 kHz. or lower. Typically, if the frequency of the local oscillator is 27 MHz., the information is after passage through mixer 82 at a frequency of 27.05 to 34.5 MHz. corresponding to an original 50 kHz. to 7.5 MHz. range, for example. The mixer 82 then serves to up-convert the Doppler frequency electrically to the operating range of the discriminator 92. Thus by up-converting the frequency range of the electrical signal before input into the discriminator 92, a discriminator having a wide frequency range serves to cover the entire range of the Doppler shifted signals. This up-converted signal from mixer 82 is then converted to a DC signal typically at the rate of 100 mv. per MHz. by a Forter-Seely or other type wide band discriminator 92 which is preferably centered at about 30 MHz. with about a 10 MHz. bandwidth. Noise is removed by a low-pass filter 94 and an operational amplifier 96 is then used for loading and centering the output of discriminator 92, so that a typical output of 5 to 750 mv. on line 100 corresponds to a typical original range of 50 kHz. to 7.5 MHz.

This output signal can then be directly entered into a computer or other device, used to provide a written record or to deflect a needle on a dial as desired. Of course, this system can be calibrated simply by choosing an appropriate scattering angle and by taking into account the nature of the media as discussed above.

The present invention then sets forth a novel frequency to voltage converter which is especially useful in conjunction with a laser beam velocity measuring or anenometer system to produce an analog output voltage which is directly proportional to the velocity of the media being measured. Of course, many variations of the example of the invention set forth in this application are possible without departing from the spirit of the invention. Consequently, the scope of the invention is intended to be limited only by the scope of the appended claims.

What we claim is:

1. A velocity measuring system comprising:
   means for producing a beam of monochromatic light,
   means for directing at least a portion of said beam onto a flowing media so that at least a portion of the directed beam is shifted in frequency by an amount proportional to the velocity of said flowing media,
   means for combining at least a part of said shifted portion of said beam with an unshifted beam of monochromatic light to produce a combined beam,
   means for converting said combined beam into an electrical signal, varying in amplitude in the same manner as said combined beam varied in intensity,
   means for mixing said electrical signal with a sinusoidal signal so that a mixed frequency modulated signal having a frequency greater than the frequency of said combined beam is produced, and
   discriminator means for converting said modulated signal to a direct current voltage signal so that the amplitude of said direct current voltage varies directly with the velocity of said flowing media.

2. A system as in claim 1 including means for delaying in time a portion of said electrical signal and for combining the delayed and undelayed portions, of said electrical signal, so that the direct current voltage produced by said discriminator means is substantially continuous.

3. A system as in claim 2 wherein said delaying and combining means includes a first isolation amplifier for receiving and amplifying said electrical signal, a second isolation amplifier for receiving and amplifying said electrical signal, a delay line connected to the output of said second isolation amplifier and a summing amplifier having as its inputs the outputs of said first isolation amplifier and said delay line and having its output connected to said mixing means.

4. A system as in claim 1 wherein said unshifted beam is the portion of said directed beam which is unshifted in frequency.

5. A system as in claim 4 wherein said directed beam passes through said media.

6. A system as in claim 5 wherein said directing means includes a first lens for focusing said directed beam onto said media, a second lens for focusing the portion of the shifted beam scattered at a given angle, a third lens for focusing said unshifted beam and mirror means for combining the beam scattered at a given angle and unshifted beam.

7. A system as in claim 6 wherein said means for converting said combined beam includes a photodetector.

8. A system as in claim 1 including means for amplifying said electrical signal before said signal is conveyed to said mixer.

9. A system as in claim 8 including local oscillator means for producing said sinusoidal signal.

10. A system as in claim 1 wherein said producing means is a helium-neon laser.

11. A system as in claim 1 wherein said mixed signal is a suppressed carrier, upper and lower sideband signal.

12. A system as in claim 1 including means for removing one of said sidebands and wherein said discriminator means converts the remaining sideband signal to a direct current voltage signal.

13. A system as in claim 12 wherein said removing means removes the lower sideband.

14. A velocity measuring system comprising:
means for producing a beam of monochromatic light,
means for directing a portion of said monochromatic beam onto a flowing media whose velocity is being measured so that a portion of the directed beam is shifted in frequency by an amount proportional to the velocity of said flowing media,
means for combining at least a portion of said shifted beam with an unshifted beam of monochromatic light to produce a combined beam,
means for converting said combined beam into an electrical signal,
means for delaying in time a portion of said electrical signal and for combining the delayed and undelayed portions of said electrical signal so that said electrical signal is continuous and substantially undistorted, and
means for converting said electrical signal into a direct current voltage signal having an amplitude which varies directly with the velocity of said flowing media.

15. In a velocity measuring system for determining the velocity of a flowing media with means for directing a portion of a laser beam onto the media so that a portion of the directed portion is scattered and shifted in frequency an amount proportional to the velocity of the media, means for combining at least a portion of the shifted beam with an unshifted beam and converting this optical signal into an electrical signal, and means for converting the electrical signal into a direct current voltage signal having an amplitude proportional to the velocity of said media, the improvement in said converting means comprising:
means for mixing said electrical signal with a sinusoidal signal to produce a mixed frequency modulated signal, and
discriminator means for converting said mixed signal to a direct current voltage signal having an amplitude which varies directly with the velocity of said flowing media.

16. In a system as in claim 15, the further improvement including mean for delaying in time a portion of said electrical signal and for combining the delayed and undelayed portions of said signal so that said electrical signal is continuous and substantially undistorted.

17. A method of measuring the velocity of a flowing media comprising the steps of:
directing a beam of monochromatic light onto said media so that a portion of said beam is shifted in frequency an amount proportional to the velocity of said media,
combining the shifted beam with an unshifted beam to produce a combined beam,
converting said combined beam into an electrical signal varying in amplitude in the same manner as said combined beam varied in intensity,
mixing said electrical signal with a sinusoidal signal so that a frequency modulated mixed signal is produced, and
converting the mixed signal to a direct current voltage signal so that the amplitude of said voltage signal varies directly with the velocity of said flowing media.

18. A method as in claim 17 including the additional steps of delaying in time a portion of said electrical signal and adding together the delayed and undelayed portions of said electrical signal so that the electrical signal is continuous and substantially undistorted.